(12) United States Patent
Jepson et al.

(10) Patent No.: US 12,331,158 B2
(45) Date of Patent: Jun. 17, 2025

(54) POLYESTER POLYMER AND POLYESTER-BASED HEAT RESISTANT COATING FOR COOKWARE OR BAKEWARE

(71) Applicant: PPG Industries Ohio, Inc., Cleveland, OH (US)

(72) Inventors: Peter R. Jepson, Exton, PA (US); Thomas J. Bate, Glenview, IL (US); David Daffern, Toronto (CA)

(73) Assignee: PPG Industries Ohio, Inc., Cleveland, OH (US)

( * ) Notice: Subject to any disclaimer, the term of this patent is extended or adjusted under 35 U.S.C. 154(b) by 251 days.

(21) Appl. No.: 17/755,208

(22) PCT Filed: Oct. 23, 2020

(86) PCT No.: PCT/US2020/056990
§ 371 (c)(1),
(2) Date: Apr. 22, 2022

(87) PCT Pub. No.: WO2021/081285
PCT Pub. Date: Apr. 29, 2021

(65) Prior Publication Data
US 2022/0389155 A1 Dec. 8, 2022

Related U.S. Application Data

(60) Provisional application No. 62/925,928, filed on Oct. 25, 2019.

(51) Int. Cl.
*C08G 63/20* (2006.01)
*A47J 36/02* (2006.01)
(Continued)

(52) U.S. Cl.
CPC ............ *C08G 63/20* (2013.01); *A47J 36/025* (2013.01); *A47J 36/04* (2013.01); *C08G 63/127* (2013.01);
(Continued)

(58) Field of Classification Search
CPC ...... C08G 63/20; C08G 63/127; C08G 63/85; C09D 7/20; C09D 5/18; C09D 167/02; A47J 36/025; A47J 36/04
(Continued)

(56) References Cited

U.S. PATENT DOCUMENTS

| | | | |
|---|---|---|---|
| 4,581,093 A | 4/1986 | Noyes et al. | |
| 6,284,845 B1 * | 9/2001 | Panandiker | C09D 167/00 528/196 |

(Continued)

FOREIGN PATENT DOCUMENTS

| | | |
|---|---|---|
| CN | 101245209 | 8/2008 |
| CN | 102504265 | 6/2012 |

(Continued)

OTHER PUBLICATIONS

International Search Report and Written Opinion received for PCT Application Serial No. PCT/US2020/056990 dated Feb. 25, 2021, 9 pages.

*Primary Examiner* — Ling Siu Choi
*Assistant Examiner* — Ronald Grinsted (57) ABSTRACT

A polyester polymer is polymerized from an alcohol component including a diol and a polyol and an acid component including terephthalic acid and isophthalic acid, with the terephthalic acid and isophthalic acid present in a desired molar ratio. The polyester polymer also includes carboxylic acid functional groups, a weight average molecular weight (MW) of at least 5000 Daltons (Da), and an acid value (AV) of 40 to 65. The polyester polymer may be formulated into (Continued)

a water-based coating composition for substrates such as articles of cookware to form a coating that is highly heat resistant and flexible while also providing non-stick properties with good release.

20 Claims, 3 Drawing Sheets

(51) Int. Cl.
*A47J 36/04* (2006.01)
*C08G 63/127* (2006.01)
*C08G 63/85* (2006.01)
*C08G 63/91* (2006.01)
*C09D 5/18* (2006.01)
*C09D 7/20* (2018.01)
*C09D 167/02* (2006.01)

(52) U.S. Cl.
CPC ........... *C08G 63/85* (2013.01); *C08G 63/916* (2013.01); *C09D 5/18* (2013.01); *C09D 7/20* (2018.01); *C09D 167/02* (2013.01)

(58) Field of Classification Search
USPC ......................................................... 524/513
See application file for complete search history.

(56) References Cited

U.S. PATENT DOCUMENTS

| | | | |
|---|---|---|---|
| 6,893,724 | B2 | 5/2005 | Lin et al. |
| 8,211,546 | B2 | 7/2012 | Fukushima et al. |
| 9,518,196 | B2 | 12/2016 | Nixon et al. |
| 10,100,199 | B2 | 10/2018 | Torncrona et al. |
| 10,389,858 | B2 | 8/2019 | Yu et al. |
| 2011/0308989 | A1 | 12/2011 | Berrux et al. |
| 2012/0135168 | A1 | 5/2012 | Ha et al. |
| 2013/0034741 | A1* | 2/2013 | Mauer, III ........... C09D 167/00 428/480 |
| 2014/0154476 | A1 | 6/2014 | Perillon et al. |
| 2016/0115345 | A1* | 4/2016 | Kuo ........................ B05D 1/28 427/427.4 |
| 2020/0362116 | A1 | 11/2020 | Chen et al. |

FOREIGN PATENT DOCUMENTS

| | | |
|---|---|---|
| CN | 102827375 | 12/2012 |
| CN | 105331155 | 2/2016 |
| CN | 105602418 | 5/2016 |
| CN | 105713488 | 6/2016 |
| EP | 1067159 A1 | 1/2001 |
| EP | 2505619 | 10/2012 |
| KR | 101662151 B1 | 10/2016 |
| WO | WO2013030503 A2 | 3/2013 |
| WO | 2015145995 A | 8/2015 |

* cited by examiner

POLYESTER POLYMER AND POLYESTER-BASED HEAT RESISTANT COATING FOR COOKWARE OR BAKEWARE

CROSS-REFERENCE TO RELATED APPLICATIONS

The present application is a U.S. National Stage of International Application No. PCT/US2020/056990, filed Oct. 23, 2020, which claims priority to U.S. Provisional Application No. 62/925,928, filed Oct. 25, 2019, the entire disclosures of which are hereby expressly incorporated herein by reference.

BACKGROUND

1. Field of the Disclosure

The present disclosure provides a polyester polymer and a coating composition based on the polyester polymer that may be applied to an interior, or food-contact, surface and/or to an exterior, or heat-contact, surface of an article of cookware or bakeware.

2. Background

Heat resistant coatings are applied to substrates such as cookware or bakeware to cover the substrate and to provide additional functions such as aiding in heat transfer, providing a non-stick release surface, and/or providing a decorative color or aesthetic finish. Prior coating compositions have either been based on fluoropolymers or have employed non-fluoropolymer base resins but tend to be brittle and potentially prone to crack-based defects which may limit their service life.

Additionally, many current coating compositions, whether used for interior or exterior cookware and bakeware coatings, are formulated using non-aqueous solvents, such as n-methyl-2-pyrrolidone (NMP) which are either currently subject to strict environmental regulation or are likely to become so in the future.

What is needed is a coating composition for interior and/or exterior cookware or bakeware surfaces that is an improvement over the foregoing.

SUMMARY

The present disclosure provides a polyester polymer polymerized from an alcohol component including a diol and a polyol and an acid component including terephthalic acid and isophthalic acid, with the terephthalic acid and isophthalic acid present in a molar ratio of terephthalic acid to isophthalic acid of 0.6:1.0 to 0.9:1.0. The polyester polymer also includes carboxylic acid functional groups, a weight average molecular weight (MW) of at least 5000 Daltons (Da), and an acid value (AV) of 40 to 65.

Also provided is a method of forming a polyester polymer by reacting, in a first stage at temperature of 80° C. to 240° C. in the presence of a catalyst, an alcohol component including a diol component and a polyol component and an acid component including terephthalic acid and isophthalic acid, wherein the terephthalic acid and isophthalic acid are present in a molar ratio of terephthalic acid to isophthalic acid of 0.6:1.0 to 0.9:1.0, to form a polyester polymer having an acid value of (AV) of 20 or less.

The polyester polymer may be formulated into a water-based coating composition for substrates such as articles of cookware to form a coating that is highly heat resistant and flexible while also providing non-stick properties with good release.

Also provided is a coated article, including a substrate, and a coating on the substrate, the coating including polyester and having at least one of: a glass transition temperature of at least 80° C. as determined by dynamic scanning calorimetry (DSC), a pencil hardness of at least 2 H at a temperature of 400° F. (204° C.) according to ASTM D3363, and a pass result when tested for 0 T bend according to ASTM D4145.

BRIEF DESCRIPTION OF THE DRAWINGS

The above-mentioned and other features and advantages of this disclosure, and the manner of attaining them, will become more apparent and the disclosure itself will be better understood by reference to the following description taken in conjunction with the accompanying drawings. These above-mentioned and other features of the disclosure may be used in any combination or permutation.

Corresponding reference characters indicate corresponding parts throughout the several views. The exemplifications set out herein illustrate examples of the disclosure, and such exemplifications are not to be construed as limiting the scope of the disclosure in any manner.

DETAILED DESCRIPTION

I. Introduction

The present disclosure provides a coating composition that may be applied to an interior, or food-contact, surface and/or to an exterior, or heat-contact, surface of an article of cookware or bakeware. Further, the present disclosure provides a fluoropolymer-free coating composition that may be formulated as an aqueous or water-based composition for application to cookware or bakeware to form a non-stick coating with good release properties that is highly heat resistant, yet flexible. The coating may possess non-stick properties. The coating composition is formulated from a base resin, such as a polyester resin, that may optionally be modified with a silicon-containing component such as an organoalkoxysilane.

A. Substrates

Figure 1A:
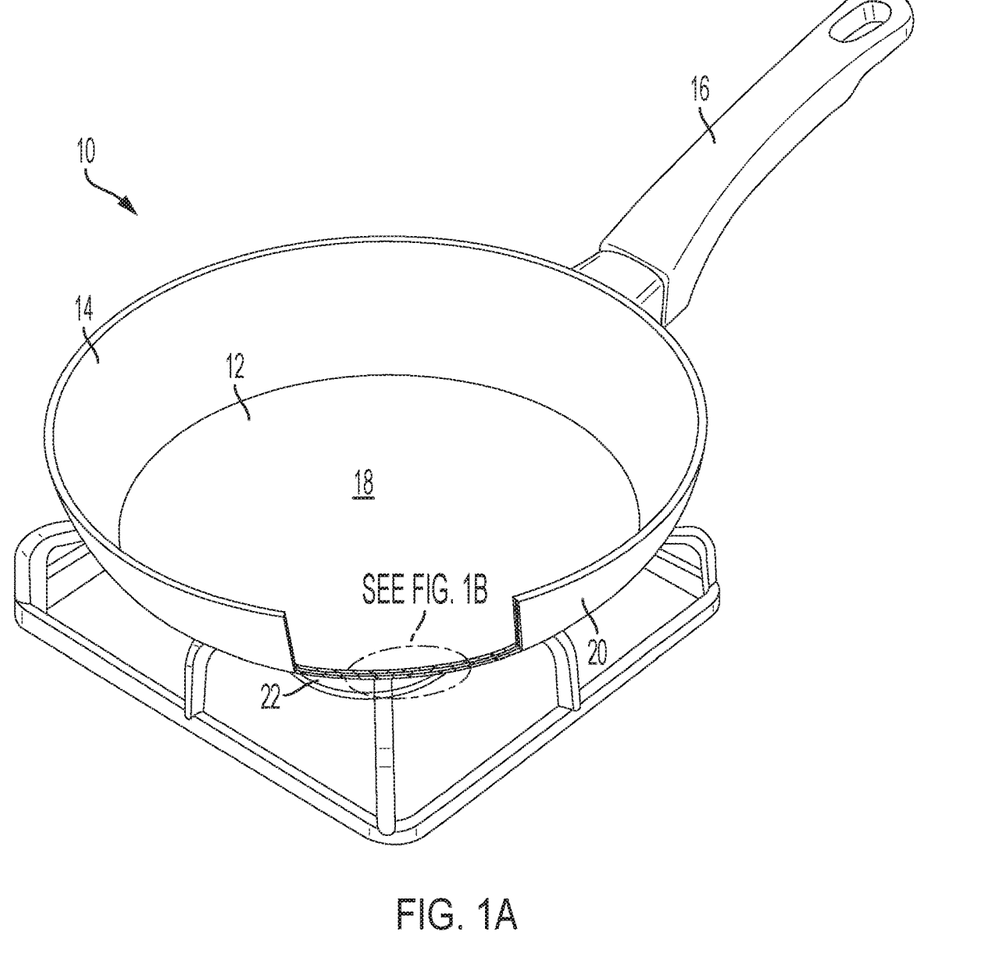
FIG. 1A is a partial sectional view of an exemplary article of cookware, shown as a pan, including a coating in accordance with the present disclosure.

Referring to FIG. 1A, an article of cookware 10 is shown in the form of a pan, which generally includes a circular bottom wall 12, an annular side wall 14, and a handle 16. Cookware article 10 is typically a metal or metal alloy such as stainless steel, aluminum, and carbon steel, but may also be a ceramic material, a plastic or a composite, for example.

Figure 1B:
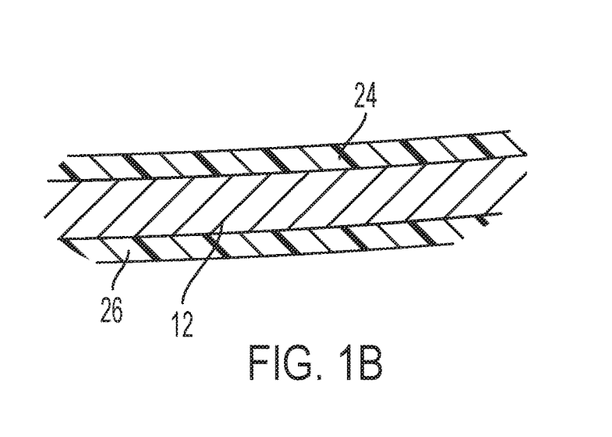
FIG. 1B is a sectional view through a wall of the pan of FIG. 1A.

Bottom and side walls 12 and 14 include an interior or food contact surface 18 facing the food to be cooked, as well as an opposite, exterior or heat contact surface 20 which, in use, faces, is adjacent to, or contacts a heat source or heating element 22. As shown in FIG. 1B, article of cookware 10 may include an interior coating 24 and/or an exterior coating 26 over at least a portion of its respective interior and/or exterior surfaces 18 and 20, including at least a portion of, or all of, bottom wall 12 and/or side walls 14.

In this manner, the present coating compositions may be used as either an interior coating or an exterior coating. Although article of cookware 10 is shown as a pan, the present coating compositions may also be used to form coatings for other articles of cookware, such as skillets, griddles, pots and the like, as well as articles of bakeware or other cooking articles which are exposed to heat in use.

When used in cookware or bakeware applications, coatings formed from the present coating compositions are highly heat resistant though, as discussed in further detail below, may also have a decorative function and may include one or more pigments or other additives to provide a visually aesthetic color.

The present coating compositions may also be used to coat non-cookware articles, such as rollers, molds, conduits and fasteners, which require a non-stick or release property and/or which are exposed to heat in use.

B. Coating Compositions

The present coating compositions may be a topcoat, i.e., an exterior-most or exteriorly exposed coating, which either may be applied directly to the outer surface of the substrate article or alternatively, may be applied over one or more underlying coatings, or undercoats. For example, one undercoat may be a primer, which is applied directly to the outer surface of the substrate article, with the present coating applied over the primer. The present coating compositions may also form part of a coating system which includes a primer together with a mid-coat applied over the primer, with the present coating composition applied over the mid-coat. Further, the primer layer may include one or more distinct, separately-applied layers, and the midcoat may also include one or more distinct, separately-applied layers.

i. Polyester Polymer

As described below, the present disclosure provides a polyester polymer which includes an alcohol component including a diol and a polyol, an acid component including terephthalic acid and isophthalic acid, wherein the terephthalic acid and isophthalic acid are present in a desired molar ratio. The polyester polymer includes carboxylic acid functional groups, has a weight average molecular weight (MW) of at least 5000 Daltons (Da), and an acid value (AV) of 40 to 65.

The polyester polymer of the present coating compositions is film-forming and provides heat resistance and may be a polyester polymer having reactive substituent groups, such as end groups, which may react with other molecules to modify the polymer in the manner described below. The polyester polymer having reactive groups is referred to as "functionalized" polyester, for example. The functional groups may be carboxyl (COOH) groups or hydroxyl (OH) groups which groups may be end groups of the polymer chains, such that polymer may be hydroxyl terminated. In this manner, the polyester polymer may be "functionalized" with hydroxyl groups and carboxyl groups, which aid in making the polymer water-soluble through neutralization with a corresponding base, such as dimethylethanolamine (DMAE), such that the polyester polymer may be formulated in aqueous-based coating systems.

The polyester polymer may comprise an alcohol component including a diol and a polyol, an acid component including two chemically distinct diacids, and free carboxylic acid functional groups. It has surprisingly been found the ratio of the diacids, such as isophthalic acid to terephthalic acid, may improve the balance of flexibility, elongation, and toughness of the polymer coating. The appropriate ratio also results in a high glass transition temperature.

The polyester polymer may have the structure shown in Formula I below:

wherein n=2.

The polyester polymer may be prepared in two successive reaction stages. In a first stage, in the presence of a catalyst, an alcohol component including a diol and a polyol component and an acid component including two chemically distinct diacids, are reacted in the presence of an end-capping agent. In a second stage, the polyester polymer of the first stage is reacted with an anhydride to install free carboxylic acids. Following the second stage, the mixture may be thinned with a solvent. The mixture may then be neutralized via addition of a base.

In the first stage, a polymer may be formed by reacting one or more diols, such as ethylene glycol, one or more polyols, such as trimethylolpropane, two chemically distinct diacids, such as isophthalic acid and terephthalic acid, and an end capping agent, such as benzoic acid, in the presence of a catalyst, such as titanium (IV) butoxide.

During the first stage, the reaction temperature may be at any value ranging from 80° C. or greater, 100° C. or greater, 120° C. or greater, 140° C. or greater, 160° or greater, or 180° C. or lower, 200° C. or lower, 220° C. or lower, or 240° C. or lower, any other range using these endpoints, such as from 80° C. to 240° C., from 120° C. to 200° C., or from 160° C. to 180° C. Also, water may be removed from the mixture until a desired AV (acid value) is reached. For example, water may be removed until the AV is less than 20, less than 15, less than 10, or greater than 5, or any other range using these endpoints such as from 5 to 20, from 5 to 15, or from 5 to 10. As used herein, "acid value (AV)" is defined as the number of milligrams of potassium hydroxide (KOH) required to neutralize one gram of a chemical substance.

During the first stage of the reaction, a catalyst may be used to facilitate the formation of the ester bonds. The catalyst may be a tin- or titanium-based catalyst. Suitable catalysts may include titanium (IV)-based catalysts and tin (IV)-based catalysts, such as titanium (IV) butoxide and dibutyltin dilaurate, for example.

During the first stage, the catalyst may be present in an amount of 0.01 wt. % or greater, 0.05 wt. % or greater, or 0.1 wt. % or lower, 0.2% or lower, or any other range using these endpoints, such as from 0.01 wt. % to 0.2 wt. %, or 0.05 wt. % to 0.1 wt. %.

In a second stage, an anhydride, such as trimellitic anhydride, may be added to the polymer to react with free hydroxyl groups, such as terminal hydroxyl groups, to endcap the polymer. Following the second stage, the mixture may be thinned with a solvent, such as ethylene glycol monobutyl ether. The mixture may further be treated under neutralization conditions using an amine base, such as dimethylethanolamine (DMEA).

During the second stage, the reaction temperature may be at any value ranging from 130° C. or greater, 140° C. or greater, 150° C. or greater, 160° C. or greater, 170° C. or lower, 180° C. or lower, 190° C. or lower, 200° C. or lower, 210° C. or lower, or any other range using these endpoints, such as from 130° C. to 210° C., from 140° C. to 190° C., or from 150° C. to 180° C.

After the second stage, the AV may be at any value ranging from 40 to or 65, such as 40 or greater, 45 or greater, 50 or greater, or 55 or lower, 60 or lower, 65 or lower, or any other range using these endpoints, such as 40 to 65, 50 to 60, or 45 to 55, for example.

Following the second stage, the mixture may be thinned to a desired solid content. Suitable solvents that may be used include, but are not limited to, ethylene glycol monobutyl ether, diethylene glycol monomethyl acetate, propylene glycol monomethyl ether acetate, and mixtures of esters, such as Estasol, available from Chemoxy International, Middlesbrough, UK.

The mixture may be neutralized by adding base. An amine base may be used for the neutralization. Suitable amine bases include, but are not limited to, dimethylethanolamine (DMEA), 2-amino-2-methyl-1-propanol, and aqueous ammonia.

In the polyester polymer, the weight percentage of the diol, such as ethylene glycol, or the combined weight percentage where more than one diol is used, as a percentage of the total polyester polymer weight, may comprise 8.0% or greater, 9.0% or greater, 10.0% or greater, 11.0% or greater, 12.0% or greater, 12.5%, or greater, or 13.0% percent or lower, 13.5% or lower, 14.0% or lower, 15.0% or lower, or 16% or lower. The diol, or more than one diol, may be present in the composition in a weight percentage of the total polymer ranging from 8.0% to 16.0%, such as 12.0% to 13.5%, 12.5% to 13.0%, or any other range combination using these endpoints.

In the polyester polymer, the weight percentage of the polyol, such as trimethylolpropane, or the combined weight percentage where more than one polyol is used, as a percentage of the total polyester polymer weight may comprise 20% or greater, 22% or greater, 24% or greater, 25% or greater, 26% or greater, 27% or greater, 28% or greater, 29% or greater, or 30% or lower, 31% or lower, 32% or lower, 33% or lower, 34%, or lower, 35% or lower, 37% or lower, or 40% or lower. The polyol, or more than one polyol, may be present in the composition in a weight percentage of the total polymer ranging from 20% to 40%, such as 29% to 33%, 28% to 32%, or any other range combination using these endpoints.

In the polyester polymer, the molar ratio of diol to polyol, such as ethylene glycol to trimethylolpropane, may be 0.3:1.0 or greater, 0.4:1.0 or greater, 0.5:1.0 or greater, 0.6:1.0 or greater, or 0.7:1.0 or lower, 0.8:1.0 or lower, 0.9:1.0 or lower, or any other range combination using these endpoints.

In the polyester polymer, the weight percentage of the first diacid, such as terephthalic acid, as a percentage of the total polyester polymer weight, may comprise 19.0% or greater, 19.5% or greater, 20.0% or greater, 20.5% or greater, 21.0% or greater, 21.5% or greater, 22.0% or greater, 22.5% or greater, or 23.0% or lower, 23.5% or lower, 24.0% or lower, 24.5% or lower, 25.0% or lower, 25.5% or lower, or 26.0% or lower. The first diacid may be present in the composition in a weight percentage of the total polymer ranging from 19.0% to 26.0%, 21.0% to 24.0%, or any other range combination using these endpoints.

In the polyester polymer, the weight percentage of the second diacid, such as isophthalic acid, as a percentage of the total polyester polymer weight may comprise 23.0% or greater, 23.5% or greater, 24.0% or greater, 24.5% or greater, 25.0% or greater, 25.5% or greater, 26.0% or greater, 26.5% or greater, or 27.0% or lower, 27.5% or lower, 28.0% or lower, 28.5% or lower, 29.0% or lower, 29.5% or lower, or 30.0% or lower. The second diacid may be present in the composition in a weight percentage of the total polymer ranging from 23.0% to 30.0%, 25.5% to 28.0%, 26.0% to 27.0%, or any other range combination using these endpoints.

In the polyester polymer, the molar ratio of the first diacid to the second diacid, such as terephthalic acid to isophthalic acid, may be 0.6:1.0 or greater, 0.7:1.0 or greater, or 0.8:1.0 or lower, 0.9:1.00 or lower, any range combination using these endpoints. For example, the ratio of terephthalic acid to isophthalic acid may be 0.86:1.00. The foregoing ratio of terephthalic acid to isophthalic acid facilitates balancing desired properties including flexibility, elongation and toughness of the polyester polymer while providing a high glass transition temperature.

In the polyester polymer, the weight percentage of the end-capping agent, such as benzoic acid, as a percentage of the total polyester polymer weight may comprise 1.0% or greater, 1.5% or greater, 2.0% or greater, or 2.5% or lower, 3.0% or lower, 3.5% or lower, or 4.0% or lower. The end-capping agent may be present in the composition in a weight percentage of the total polymer ranging from 1.0% to 4.0%, 2.0% to 2.5%, or any other range combination using these endpoints.

In the polyester polymer, the weight percentage of the anhydride, such as trimellitic anhydride, as a percentage of the total polyester polymer weight may comprise 5.0% or greater, 5.5% or greater, 6.0% or greater, or 6.5% or lower, 7.0% or lower, or 7.5% or lower. The anhydride may be present in the composition in a weight percentage of the total polymer ranging from 5.0% to 7.5%, 5.5% to 7.0%, or any other range combination using these endpoints.

The average molecular weight (MW) of the polyester polymer may be 5000 Daltons (Da) or greater, 7000 Da or greater, 8000 Da or greater, 10,000 Daltons (Da) or greater, 12,000 Da or greater, or 14,000 Da or lower, 16,000 Da or lower, 18,000 Da or lower, 20,000 Da or lower, or any range combination using these endpoints, such as from 5000 Da to 20,000 Da, from 10,000 Da to 18,000 Da, or from 12,000 Da to 16,000 Da, for example.

The glass transition temperature ($T_g$) of the polyester polymer may be 60° C. or greater, 70° C. or greater, 80° C. or greater, 85° C. or lower, 90° C. or lower, 95° C. or lower, or any range combination using these endpoints, such as from 60° C. to 95° C., or from 70° C. to 90°, for example.

Once the polymer is fully crosslinked, the $T_g$ of the polyester polymer may be 80° C. or greater, 85° C. or greater, 90° C. or greater or greater, 95° C. or greater, 100° C. or greater, 110° C. or greater, or 115° C. or lower, 120° C. or lower, 125° C. or lower, 130° C. or lower, 135° C. or lower, or any range combination using these endpoints, such as 60° C. to 135° C., 80° C. to 125° C., or 95° C. to 120° C. For example, the $T_g$ of the fully crosslinked polyester polymer may be 120° C.

ii. Formulation of Polyester-Based Coating

The coating composition is formulated from the polyester polymer by mixing the polyester resin with a base, solvents, water, surfactants, fillers, release agents, crosslinkers, catalyst and pigments. The coating compositions are applied to a substrate by spray, roller coat, coil coating, curtain coat and dipping and are then heat cured at various time/temperature conditions depending on the application. The cured coating is also sufficiently flexible to be post-formed.

The amount of the polyester polymer, based on the "wet" weight of the coating composition prior application to a substrate followed by curing, may comprise 10 wt. % or greater, 20 wt. % or greater, 30 wt. % or greater, 40 wt. % or greater, 50 wt. % or lower, 60 wt. % or lower, 70 wt. % or lower, or 80% or lower, or any other range combination using these endpoints, such as 10 wt. % to 80 wt. %, 40 wt. % to 70 wt. %, or 30 wt. % to 60 wt. %.

Based on the "dry" or solids weight of the coating composition after application to a substrate followed by curing, the amount of polyester polymer may comprise 5 wt. % or greater, 10 wt. % or greater, 20 wt. % or greater, 30 wt. % or greater, 40 wt. % or lower, 50 wt. % or lower, or 60 wt. % or lower, 70 wt. % or lower, or 80 wt. % or lower, or any other range combination using these endpoints, such 5 wt. % to 80 wt.%, 10 wt. % to 70 wt. %, or 20 wt. % to 60 wt. %.

iii. Silicon-Modified Coating Composition

The present coating compositions may also include at least one organoalkoxysilane which reacts with, and modifies, the polyester polymer. The organoalkoxysilane may be grafted onto the free hydroxy groups of the polyester polymer following the second stage of the reaction.

Exemplary organoalkoxysilanes are of the following formula:

$$R_xSi(OR')_{4-x}$$

wherein:

R is one or more moieties chosen independently from linear, branched, or cyclic alkyl and aryl, including, for example, cyclohexyl and/or phenyl;

R' is methyl, ethyl, propyl or alkyl; and x is 0, 1, 2, or 3.

In some examples, R is $C_6$ aryl or a linear or branched alkyl having from as few as 1, 2, 3, or as many as 4, 5, 6, or more carbon atoms, or a number of carbon atoms in any other range combination using these endpoints. In an example, R is selected from methyl, ethyl, propyl, and phenyl. In some examples, x is at least 1 and less than 4.

In some examples, the organoalkoxysilane comprises at least one organoalkoxysilane selected from methyltrimethoxysilane, methyltriethoxysilane, dimethyldiethoxysilane, dimethyldimethoxysilane, trimethylmethoxysilane, trimethylethoxysilane, phenyltrimethoxysilane, phenyl triethoxysilane, cyclohexyltrimethoxy silane, or combinations of the foregoing.

In some examples, the organoalkoxysilane is a functionalized siloxane, such as 3-aminopropyltriethoxysilane, (3-glycidoxypropyl)trimethoxysilane, and allyltrimethoxysilane. One suitable organoalkoxysilane is RSN-5314 resin, available from Dow Corning of Midland, Mich.

Other suitable silicon materials are silsesquioxanes having the following formula:

$$[RSiO3/2]_n.$$

Examples of such materials are methoxy terminated silsesquioxanes such as Dowsil 3074 or Silres SY231 and ethoxy terminated or t-Butoxy terminated silsesquioxanes such as SILRES® REN 80.

The amount of organoalkoxysilane, based on the "wet" weight of the coating composition prior application to a substrate followed by curing, may comprise 0 wt. % or greater, 4 wt. % or greater, 8 wt. % or greater, 12 wt. % or greater, or 20 wt. % or lower, 30 wt. % or lower, or 40 wt. % or lower, or any other range combination using these endpoints, such as 0 wt. %, 4 wt. % to 40 wt. %, 8 wt. % to 20 wt. %, or 12 wt. % to 20 wt. %.

Based on the "dry" or solids weight of the coating composition after application to a substrate followed by curing, the amount of organoalkoxysilane may comprise 0 wt. % or greater, 10 wt. % or greater, 30 wt. % or greater, or 40 wt. % or greater, or 50 wt. % or lower, 60 wt. % or lower, or 70 wt. % or lower, or any range combination using these endpoints, such as 0 wt. %, 10 wt. % to 70 wt. %, 30 wt. % to 60 wt. %, or 40 wt. % to 50 wt. %.

Alternatively stated, the amount of organoalkoxysilane, based on the combined weight of the base resin and the organoalkoysilane, may comprise 0 wt. % or greater, 5 wt. % or greater, 15 wt. % or greater, 20 wt. % or greater, 30 wt. % or greater, or 50 wt. % or lower, 70 wt. % or lower, 85 wt.

% or lower, or 95 wt. % or lower, or any other range combination using these endpoints, such as 0 wt. %, 5 wt. % to 95 wt. %, 15 wt. % to 85 wt. %, or 20 wt. % to 70 wt.

iv. Crosslinker

The present coating compositions may also include at least one optional crosslinker to form crosslink bonds between the base resin polymer chains to promote flexibility in the present coatings. Typically, the crosslinker will react via the functionalized reactive groups on the polymer chains, e.g., carboxyl or hydroxyl groups.

The crosslinker used for carboxyl group functionalized based resins may be a metal salt such as zinc ammonium carbonate or zinc oxide.

The crosslinker may be an amino-based or melamine crosslinker, for example, a melamine type crosslinker of the following formula:

R is H or alkyl
$R^2$ is $CH_2OH$ or H

The crosslinker is a highly methylated, monomeric melamine crosslinker having the following formula:

wherein $R_1$ to $R_6$ are each selected from —H, —$CH_2OH$, —$CH_2OR_7$, and may be the same or different, wherein $R_7$ is a $C_1$ to $C_5$ alkyl group. In an example, $R_7$ is selected from —$CH_3$ or —$C_4H_9$. In another example, $R_1$ to $R_6$ are each —$CH_2OCH_3$. One suitable crosslinker is hexamethoxymethylmelamine, such as Cymel 303, available from Allnex SA of Brussels, Belgium.

Other crosslinkers may be of the glycouril type, having the following formula:

Further crosslinkers may be of the urea type, having the following formula:

R is methyl or butyl
$R^2$ is H, alkyl, or alkoxy

Still further crosslinkers may be of the benzo-guanamine type, having the following formula:

R is H, ethoxy, methoxyethyl, or ethoxyethyl

Still further crosslinkers include isocyanates, carbodiimides and dicyandiamides, for example, as well as others.

The amount of crosslinker, based on the "wet" weight of the coating composition prior application to a substrate followed by curing, may comprise 0 wt. % or greater, 0.2 wt. % or greater, 0.8 wt. % or greater, or 1 wt. % or lower, 2 wt. % or lower, or 10 wt. % or lower, or any other range combination using these endpoints, such as 0 wt. % to 10 wt. %, 0.2 wt. % to 2 wt. %, or 0.8 wt. % to 1 wt. %.

Based on the "dry" or solids weight of the coating composition after application to a substrate followed by curing, the amount of crosslinker may comprise 0 wt. % or greater, 0.2 wt. % or greater, 0.8 wt. % or greater, or 2 wt. % or lower, 5 wt. % or lower, or 10 wt. % or lower, 20 wt. % or lower, or any other range combination using these endpoints, such as 0 wt. % to 10 wt. %, 0.2 wt. % to 5 wt. %, or 0.8 wt. % to 20 wt. %.

v. Solvents

The coating composition may be formulated to include one or more solvents, including primarily water, though the coating compositions may also include one or more non-aqueous solvents. As used herein, the terms "aqueous medium" and "water-based" refer to a solvent system including primarily water and, if one or more non-aqueous solvents are present, the total amount of such non-aqueous solvents is 5 wt. % or lower, 3 wt. % or lower, or 1 wt. % or lower based on the total weight of the coating composition in "wet" form prior to application to a substrate.

Alternatively, the coating composition may be formulated under solvent-free conditions. In other words, the coating composition may formulated with water and without any non-aqueous solvents. As used herein, "solvent-free" conditions refer to a solvent system including primarily water, and if any additional non-aqueous solvents are present, the total amount of such non-aqueous solvents is less than 5 wt. % or lower, 3 wt. % or lower, or 1 wt. % or lower of the total weight of the coating composition in "wet" form prior to application to a substrate.

Exemplary non-aqueous solvents include alcohols such as $C_1$-$C_8$ alcohols including methanol, ethanol, isopropanol, and t-butanol, $C_2$-$C_8$ ketones including acetone, $C_2$-$C_{20}$ ethers including ethylene glycol monobutyl ether, diethylene glycol monomethyl acetate, dipropylene glycol methyl ether, propylene glycol monomethyl ether acetate, esters, such as dimethyl esters, and mixtures of esters, including Estasol, available from Chemoxy International of Middlesbrough, UK (a mixture of dimethyl adipate, dimethyl glutarate, and dimethyl succinate), as well as other protic or non-protic solvents such as dimethylethanolamine (DMEA). DMEA may also be used as the neutralization agent, as discussed above. The solvent system is used as a carrier for the coating composition until application and curing, at which point the solvent removed by volatizing. Based on the "wet" weight of the coating composition prior to application to a substrate followed by curing, the total amount of solvents, including water and any non-aqueous solvents that may be present, may comprise 5 wt. % or greater, 10 wt. % or greater, 20 wt. % or greater, or 25 wt. % or lower, 30 wt. % or lower, 40 wt. % or lower, or any other range combination using these endpoints, such as 20 wt. % to 40 wt. %.

vi. Pigments

To provide an aesthetic appearance to the coating, one or more pigments may be used. Suitable pigments include metal oxides, ochres, minerals, synthetic pigments, or pigments of biologic origin, for example. The pigments may be used as powders or liquids, or may be formulated as a paste. The pigments may be added to the polyester polymer, the silicon-grafted polyester polymer, or both.

Based on the "wet" weight of the coating composition prior to a substrate followed by curing, the total amount of pigments may comprise 2 wt. % or greater, 5 wt. % or greater, or 10 wt. % or greater, or 20 wt. % or lower, 40 wt. % or lower, 50 wt. % or lower, or any other range combination using these endpoints, such as 10 wt. % to 30 wt. %, 5 wt. % to 20 wt. %, or 2 wt. % to 40 wt. %. Based on the "dry" or solids weight of the coating composition after application to a substrate followed by curing, the total amount of pigment(s) may comprise 5 wt. % or greater, 10 wt. % or greater, 20 wt. % or greater, or 30 wt. % or lower, 40 wt. % or lower, 50 wt. % or lower, or any other range combination using these endpoints, such as 10 wt. % to 50 wt. %, 5 wt. % to 30 wt. %, or 30 wt. % to 40 wt. %.

vii. Fillers

One or more fillers, in the form of inorganic particulate materials, may optionally be added to promote heat conductivity through the coating and/or for reinforcement for improving hardness. One suitable heat resistant filler is aluminum oxide (alumina, $Al_2O_3$), and other suitable heat resistant fillers include titanium dioxide ($TiO_2$), barium sulfate ($BaSO_4$), polyether ether ketone (PEEK), polyethersulfone (PES), and silicon carbide (SiC).

The filler will typically have a mean particle size of 0.01 micron or greater, 0.05 micron or greater, 0.1 micron or greater, or 0.75 micron or lower, 1.0 micron or lower, or 10 microns or lower, or any other range combination using these endpoints, such as 0.01 to 10 microns, 0.05 to 1.0 micron, or 0.1 to 0.75 micron, as determined by laser diffraction particle distribution analysis using a Horiba LA950V2.

The amount of thermally conductive filler added to the present coating is larger than typical amounts of fillers used for purposes of reinforcement in known exterior cookware coatings. With respect to the present coating, although not wishing to be bound by theory, it is believed that a relatively high loading of heat resistant filler promotes heat conductivity through the coating from the heat source and into the substrate. By contrast, it is believed that existing coatings are not so thermally conductive, and thereby prone to effectively retain a high amount of heat beyond their failure temperature threshold.

viii. Other Additives

Additives that may be included in the present coatings, in addition to the components described above, may include defoamers, thickeners, surface wetting agents or surfactants, dispersants, leveling agents, flow agents, release agents, pigment wetting additives.

The total amount of such additives, based on the "wet" weight of the coating composition prior to a substrate followed by curing, may comprise 0 wt. % or greater, 1 wt. % or greater, 2 wt. % or greater, or 3 wt. % or lower, 4 wt. % or lower, 5 wt. % lower, or any other range combination using these endpoints, such as 0 wt. % to 5 wt. %, or 2 wt. % to 4 wt. %.

The present coating compositions may lack fluoropolymers, wherein the coating composition is fluoropolymer-free. Per- and polyfluoroalkyl substances (PFAS) are fluorine-containing chemical compounds including perfluoroalkyl acids (PFAAs) such as perfluorooctanoic acid (PFOA), and/or perfluorooctane sulfonate (PFOS). As used herein, "PFAS free" means a polymer, a liquid chemical coating composition, or an as-applied coating which includes 1.0 wt. % or lower, 0.5 wt. % or lower, or 0.1 wt. % lower PFAS. As used herein, "fluorine free" means a polymer, a liquid chemical coating composition, or an as-applied coating which includes a fluorine content of 1.0 wt. % or lower, 0.5 wt. % or lower, or 0.1 wt. % or lower. As used herein, "fluoropolymer-free" refers to coatings compositions which include 1.0 wt. % or lower total fluoropolymer content, 0.5 wt. % or lower total fluoropolymer content, or 0.1 wt. % or lower total fluoropolymer content, based on the total solids content of the coating composition.

C. Coating Methods

The present coating compositions may be prepared by any standard formulation techniques such as simple addition and low shear mixing in an aqueous medium. The pH of the aqueous medium may be adjusted by the addition of a suitable base to a pH of 7 or higher, for example, 7.5 or higher, 8.0 or higher, 8.5 or higher, or 9.0 or lower, 9.5 or lower, 10.0 or lower, or any other range combination using these endpoints, such as 7.5 to 10.0, 8.0 to 9.5, or 8.5 to 9.0.

The polyester polymer, organoalkoxysilane (if present), and pH conditions are selected to stabilize the hydrolysis and condensation reactions to a controlled extent to form a polymer matrix of polymer chains having a limited, or relatively small, molecular weight, which is believed to impart the improved flexibility to coatings formed by the present coating compositions after same are applied to a substrate and cured.

The coating composition may be applied directly to the substrate as a base layer or primer, or may be applied over a basecoat or primer and/or a midcoat by any known technique, such as spray coating, curtain coating, or roller coating, for example, and is then cured to provide a coated substrate.

The coating composition may be applied to the substrate, followed by optional drying. Drying may take place at a drying temperature of 40° C. or greater, 50° C. or greater, 60° C. or greater, 70° C. or greater, 80° C. or greater, 95° C.

or greater, 100° C. or greater, or 105° C. or lower, 110° C. or lower, 115° C. or lower, 120° C. or lower, 125° C. or lower, or temperatures of 125° C. or greater, 150° C. or greater, 175° C. or greater, 200° C. or greater, or 225° C. or greater. Drying may comprise drying at the drying temperature for 0.5 min or less, 1 min or less, 2 min or less, or 3 min or more, 5 min or more, 10 min or more, or longer. The coating composition may be dried by air drying at ambient temperature.

Following optional drying, the coating composition is heat cured to the substrate. Curing may take place at a curing temperature of 180° C. or greater, 200° C. or greater, 220° C. or greater, or 230° C. or lower, 275° C. or lower, or 300° C. or lower, or any other range combination using these endpoints, such as 180° C. to 300° C., 200° C. to 275° C., or 220° C. to 230° C. Curing may comprise curing at the curing temperature for 3 min or less, 5 min or less, 10 min or less, or 15 min or longer, 20 min or longer, or longer. The coating composition may be cured by air curing at ambient temperature. During the drying and curing steps, all volatile components are removed, including the aqueous medium and any non-aqueous solvents.

D. Coating Properties

The present coatings are typically applied to a dry film thickness (DFT) per coat of 5 microns or more, 10 microns or more, 15 microns or more, or 20 microns or less, 25 microns or less, or 40 microns or less, or any other range combination using these endpoints, such as from 5 to 30 microns, from 10 to 25 microns, or from 15 to 20 microns.

Advantageously, the present coating compositions, after being applied to a substrate and cured, demonstrate improved flexibility as compared with prior coating systems which tend to be more brittle. This flexibility allows the coatings to be coated onto substrate geometries which may be otherwise difficult to coat, such as around tightly radiused corners or edges, and yet maintain coating integrity through service life. Flexibility may be characterized by the 0T Bend test, ASTM D4145.

Additionally, the present coatings are sufficiently flexible such that same may be mechanically formed, along with their underlying substrates, after being applied to the substrate and cured. For example, the present coating compositions may be applied to a flat disc substrate and then cured. Thereafter, the coated substrate may be subjected to a mechanical forming operation, such as bending or drawing, for example, to form the substrate into a final product shape, with the integrity of the coatings maintained through the forming process.

EXAMPLES

The following non-limiting Examples illustrate various features and characteristics of the present disclosure, which is not to be construed as limited thereto. Throughout the Examples and elsewhere herein, percentages are by weight unless otherwise indicated.

Example 1

Production of Polyester Polymer

Table 1 (below) provides the amounts used in various runs of the reaction. To synthesize the polymer, in the Stage 1 of the reaction, a mixture of ethylene glycol (CAS #107-21-1) and trimethylolpropane (CAS #77-99-6) was heated to 85° C. A mixture of ethylene glycol and titanium (IV) butoxide (CAS #5593-70-4) was added to the batch. The mixture was then heated to 100° C., and benzoic acid (CAS #65-85-0), purified isophthalic acid (CAS #121-91-5), and purified terephthalic acid (CAS #100-21-0) were added to the batch.

The batch was then heated 170° C. for 30 minutes, followed by heating to 180° C. for 120 minutes. The mixture was then held at 185° C. hold until no water was observed coming off the batch. Once no further water was observed leaving the reaction, the mixture was held at 190° C. hold for 60 minutes. A mixture of ethylene glycol and titanium (IV) butoxide was then added, the mixture was heated to 220° C. and held at that temperature until the solution was clear. The reaction was continued until the polyester displays an acid value (AV) of less than 20, with approximately 11.5% of the water removed. Once the mixture has reached these desired specifications, it was cooled to 160° C.

In a second stage of the reaction, trimellitic anhydride (CAS #552-30-7) was added to the batch. The resultant exotherm was monitored, and the temperature was maintained between 165° C.-180° C. until reaction mixture was clear. Once the mixture has cleared, the AV value was tested, and once the value has reached 50±5, the mixture was cooled to 140° C.

In the next stage of the reaction, the mixture was thinned by adding ethylene glycol monobutyl ether (CAS #111-76-2) in two parts, split 85:15. After 85 percent of the solvent was added, the amount of solid was determined. The remaining solvent was added (approximately 15% of the total) until 70% solids were observed. Once the mixture reached the desired specifications, the batch was filtered through a 25 μm filter.

In the next stage of the reaction, the batch was neutralized. In this Example, the batch was placed in an appropriate mixing vessel, and 85.7 parts of the 70% mixture from the thinned second stage of the reaction was mixed with six parts of an amine base and mixed for 30 minutes at medium speed. Then, 8.3 parts of deionized water were added. The pH of the mixture was then adjusted to a final value of 9.0-10.0 by further addition of the amine base.

Table 1 shows the polyester polymers synthesized using the technique described above, with mass noted in grams (g), percentage of monomer as a weight percent (Wt. %), and molar equivalencies (ME) of each monomer.

TABLE 1

| | Polyester polymer compositions | | | | | | | | | | | |
|---|---|---|---|---|---|---|---|---|---|---|---|---|
| | Polymer #: | | | | | | | | | | | |
| | 1 | | | 2 | | | 3 | | | 4 | | |
| Monomer | g | Wt. % | ME | g | Wt. % | ME | g | Wt. % | ME | g | Wt. % | ME |
| Ethylene glycol | 266.00 | 12.29 | 8.57 | 299.34 | 12.09 | 9.65 | 288.00 | 12.22 | 9.28 | 302.51 | 12.46 | 9.75 |

TABLE 1-continued

Polyester polymer compositions

| Monomer | Polymer 1 g | Wt. % | ME | Polymer 2 g | Wt. % | ME | Polymer 3 g | Wt. % | ME | Polymer 4 g | Wt. % | ME |
|---|---|---|---|---|---|---|---|---|---|---|---|---|
| Trimethylolpropane | 752.25 | 34.75 | 16.82 | 748.35 | 30.22 | 16.73 | 640.00 | 27.16 | 14.31 | 599.31 | 24.69 | 13.40 |
| Terephthalic acid | 449.65 | 20.77 | 5.41 | 560.27 | 22.63 | 6.74 | 560.27 | 23.78 | 6.74 | 598.24 | 24.65 | 7.20 |
| Isophthalic acid | 522.85 | 24.15 | 6.29 | 651.47 | 26.31 | 7.84 | 651.47 | 27.65 | 7.84 | 695.63 | 28.66 | 8.37 |
| Benzoic acid | 45.10 | 2.08 | 0.37 | 56.20 | 2.27 | 0.46 | 56.20 | 2.38 | 0.46 | 60.01 | 2.47 | 0.49 |
| Trimellitic anhydride | 128.87 | 5.95 | 2.01 | 160.57 | 6.48 | 2.51 | 160.57 | 6.81 | 2.51 | 171.46 | 7.06 | 2.68 |

Table 2 shows various physical properties of the polymers. Theoretical molecular weight of the polyesters at different acid values are included, as determined using the Carothers equation, shown below, in which $X_n$ is the number-average value of the degree of polymerization.

$$\bar{x}_n = \frac{1}{1-p} \quad \text{Equation 1}$$

The value represented by p is the extent of the reaction, as determined using Equation 2 below, in which $N_0$ is the number of molecules initially present as monomers, and N is the number of molecules present after a given amount of time.

$$p = \frac{N_0 - N}{N_0} \quad \text{Equation 2}$$

The ratio of acid to alcohol is shown, as is the ratio of diol to polyol. The ratio of terephthalic acid (TPA) to isophthalic acid (IPA) is noted as TPA:IPA. Acid values after both Stage 1 and 2 are provided, along with viscosity as measured after Stage 1. Viscosity was measured using a HAT Brookfield Viscometer, Spindle #14 with a small spindle adapter. Viscosity was recorded at 20 rpm and 25° C. The viscosity of Polymer 4 was too high to measure in this test. The weight percentage of solids is noted, as are the molecular weights (in Daltons) after Stages 1 and 2. Molecular weight was determined by gel permeation chromatography (GPC). Gardner color, as determined by ASTM D154, is also provided.

TABLE 2

Polyester polymer physical properties

| Polymer # | 1 | 2 | 3 | 4 |
|---|---|---|---|---|
| Theoretical MW AV 10 | 527 | 756 | 939 | 1323 |
| Theoretical MW AV 5 | 554 | 810 | 1025 | 1500 |
| Acid/Alcohol | 2.10 | 1.75 | 1.59 | 1.44 |
| Diol:Polyol | 0.51:1.00 | 0.58:1.00 | 0.65:1.00 | 0.73:1.00 |
| Diol/Polyol | 34/66 | 37/63 | 40/60 | 43/57 |
| TPA:IPA | 0.86:1.00 | 0.86:1.00 | 0.86:1.00 | 0.86:1.00 |
| Stage 1 AV | 24.00 | 17.80 | 18.20 | |
| Stage 2 AV | 44.00 | 50.20 | 53.70 | |
| Stage 1 Viscosity | 262.50 | 175.00 | 250.00 | |
| Solids (Wt. %) | 59.10 | 70.00 | 65.50 | |
| Gardner Color | | 4.00 | 4.00 | |
| Stage 1 GPC MW (Da) | | 3453 | 4800 | |
| Stage 2 GPC MW (Da) | 3497 | 6457 | 11,204 | |

Testing was also performed to determine physical properties of the polyester polymers in different solvents, using samples of Polymer 3. Specifically, viscosity, weight percentage of non-volatile components, and the acid value (AV) were determined. Solvents in which these properties were tested include ethylene glycol monobutyl ether (EGBE), diethylene glycol monomethyl acetate (DEA), propylene glycol monomethyl ether acetate (PMA), and a mixture of dimethyl adipate, dimethyl glutarate, and dimethyl succinate (Estasol). The results of these tests are shown in Table 3, below.

TABLE 3

Polymer properties in various solvents

| Test | Method | Specifications | EGBE | DEA | PMA | Estasol |
|---|---|---|---|---|---|---|
| Viscosity (Poise @ 25° C.) | Brookfield | TBD | 263 | 337.6 | 750 | 1,250 |
| % Non-Volatile | 2 hr at 150° C. | 70% +/− 1% | 69.5% | 68.0% | 69.0% | 69.8% |
| Acid Value (on Solids) | ASTMD1613-06(2012) | 40-55 | 45.6 | 52.0 | 46.8 | 46.4 |

Example 2

Formulation and Testing of Polyester-Based Coating Compositions

An exemplary formulation of the polyester-based coating composition is shown below in Table 4.

TABLE 4

Sample coating composition

| Component | Wt % wet weight (pre-cure) | Wt. % dry weight (post-cure) |
|---|---|---|
| Polyester polymer | 30-70 | 30-80 |
| Water | 10-60 | 0 |
| Pigment(s) | 2-30 | 5-50 |
| Filler(s) | 2-10 | 5-25 |
| Solvent | 5-40 | 0 |
| Base | 1-10 | 0 |
| Surfactants | 0.2-5 | 0 |
| Release agent | 0.6-5 | 1-10 |
| Crosslinkers | 0-10 | 0-20 |
| Catalyst | 0-1 | 0-2 |

Two formulations were then prepared, as shown in Table 5: one formulation ("Formulation 1") including the polyester polymer in a water-based preparation with dimethylethanolamine (DMEA), and one ("Formulation 2") including the polyester polymer with organoalkoxysilane modification in a water-based preparation with dimethylethanolamine (DMEA). All data is shown as weight percentage of the total polymer.

TABLE 5

Sample polyester-based coating formulations

| | Formulation 1 | | Formulation 2 | |
|---|---|---|---|---|
| Component | Red base | Clear top | Red base | Clear top |
| Polyester polymer | 32.11 | 32.26 | 38.17 | 37.69 |
| DMEA | 2.79 | 2.88 | 2.69 | 2.66 |
| Water | 51.36 | 51.98 | 18.14 | 26.12 |
| Pigment | 2.1 | 0.23 | 6.29 | 0.22 |
| Solvents | 7.29 | 6.96 | 26.01 | 26.23 |
| Additives | 0.44 | 0.51 | 0.82 | 0.22 |
| Crosslinkers | 3.91 | 4.54 | 6.09 | 4.66 |
| Silicone | — | 0.64 (as silicone oil) | 1.79 | 2.2 |

Table 6, below, shows a solvent-based formulation of a commercial silicon polyester for comparison purposes.

TABLE 6

Commercial silicone polyester

| Component | Wt. % |
|---|---|
| Solvent-based silicone polyester | 68.39 |
| Solvent | 27.21 |
| Additives | 1.08 |
| Pigments | 3.32 |

The formulations were then tested to define various physical characteristics of the coating compositions. Experiments were performed on both dried and cured samples. Those samples that were dried were dried for 24 hours at 150° C. This method was used for both water-based and solvent-based compositions. Samples were prepared on an aluminum weighing pan or an aluminum Q-panel. Samples for thermal evaluations were prepared by draw down on the Q-panel. Samples were neat, on a wire wound bar. Those samples that were cured were treated differently depending upon whether the composition was a neutralized, water-based composition or a neat or solvent based composition. Neutralized water-based compositions were flash dried for 5 minutes at 100° C., followed by 15 minutes of curing at 266° C. Neat or solvent-based compositions were flash dried for 5 minutes at 200° C., followed by 15 minutes of curing at 266° C. or 10 minutes at 275° C.

The glass transition temperature ($T_g$) was determined for both dried and cured samples using dynamic scanning calorimetry (DSC) using a 1 g sample of the polymer on an aluminum drying boat. The dried samples were dried for 24 hours at 150° C. This method was used for drying both water- and solvent-based polymers. Neutralized water-based compositions were flash dried for 5 minutes at 100° C., followed by 15 minutes of curing at 266° C. Neat or solvent-based compositions were flash dried for 5 minutes at 200° C., followed by 15 minutes of curing at 266° C. or 10 minutes at 275° C. A TA Instruments DSC Q2000 was used to measure the $T_g$ of the samples. Specifically, for polyester polymers, the sample was first heated from −40° C. to 300° C. at a rate of 10° C. per minute. A second heating was then performed, again from −40° C. to 300° C. at a rate of 10° C. per minute. For silicone polyesters, the sample was first heated from −40° C. to 400° C. at a rate of 10° C. per minute. A second heating was then performed, again from −40° C. to 400° C. at a rate of 10° C. per minute. A dried sample of polymer #1 (see Example 1) displays a $T_g$ from the first heating of 77.89° C. During the second heating, cured samples of the 70% resins of Polymers #1, 2, and 3 (see Example 1) display $T_g$ values of 142.54° C., 122.08° C., and 133.45° C., respectively.

Figure 2:
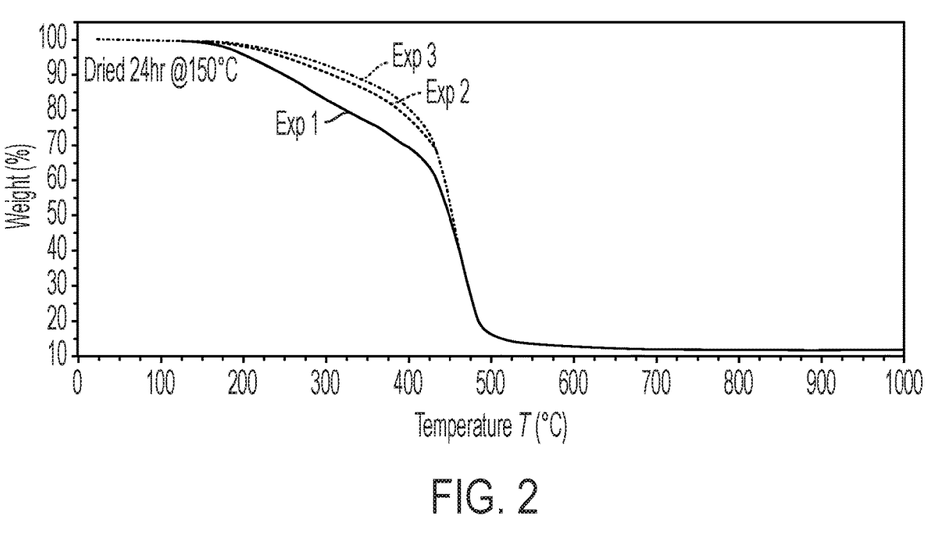
FIG. 2A is a graph of results of thermogravimetric analysis for dried polymer compositions as described in Example 2.

Thermogravimetric analysis (TGA) was then performed using a 1 g sample of the polymer on an aluminum drying boat. The dried samples were dried for 24 hours at 150° C. This method was used for drying both water- and solvent-based polymers. Neutralized water-based compositions were flash dried for 5 minutes at 100° C., followed by 15 minutes of curing at 266° C. Neat or solvent-based compositions were flash dried for 5 minutes at 200° C., followed by 15 minutes of curing at 266° C. or 10 minutes at 275° C. A TA Instruments TGA5500 was used, with heating from 25° C. to 1000° C. at a rate of 10° C. per minute. The results from these experiments are shown in FIG. 2. FIG. 2 shows results of thermogravimetric analysis of samples of polymers 1, 2, and 3 (see Example 1), each of which were dried at 150° C. for 24 hours.

Figure 3:
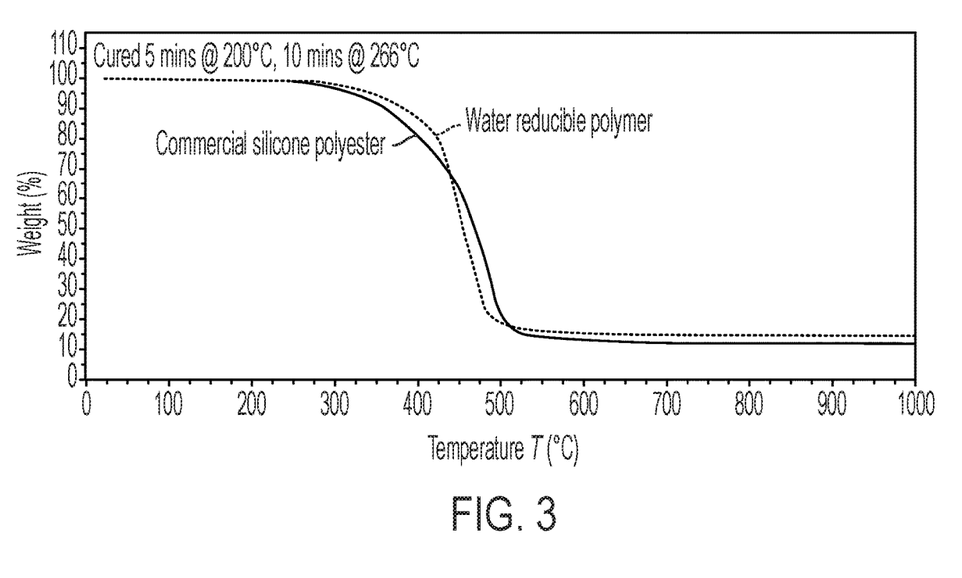
FIG. 3 is a graph of results of thermogravimetric analysis for cured polymer compositions as described in Example 2.

FIG. 3 shows results of thermogravimetric analysis of samples of a water-reducible polymer of the present disclosure in comparison to a commercial silicone polyester. The commercial silicone polyester is a 10% methyl/phenyl silicone modified polyester resin in methoxy propyl acetate (PMA). The commercial sample has comparable viscosity and solids (17-25 poise and 67 wt. % solids). Each of the compositions were cured at 200° C. for 5 minutes followed by 15 minutes of curing at 266° C.

Next, the polyester-based coating composition was compared to a commercial silicone polyester in a variety of tests. The silicone polyester and Polymers 1, 2, and 3 (see Example 1) were cured under various conditions, and their consistency was evaluated subjectively. The glass transition temperatures ($T_g$) were measured by DSC as described above. Both forward and reverse indent were measured by ASTM D2794, where Pass or Fail is defined as adhesion to the substrate versus cracking or flaking. The compositions were tested for 0 T bend using ASTM D4145. Solvent resistance was measured with methyl ethyl ketone (MEK) using ASTM D4752, with Pass being defined as no removal of the coating. Hardness was determined by ASTM D3363. A hardness of at least 4 H was deemed to be passing. Finally, the compositions were treated at 275° C. for one hour and evaluated to determine whether discoloration had occurred. Results for these tests are shown below in Table 7.

TABLE 7

Coating composition properties

| Test | Commercial silicone polyester | Polymer 1 | Polymer 2 | Polymer 3 |
|---|---|---|---|---|
| 5 mins @ 150° C. | Sticky | Sticky | Sticky | Sticky |
| 15 min @ 275° C. | OK | OK | OK | OK |
| Cured $T_g$ (° C.) | 52.42 | 142.54 | 122.08 | 113.45 |
| Forward Indent | Fail | Pass | Pass | Pass |
| Reverse Indent | Fail | Pass | Pass | Pass |
| 0T Bend | Fail | Pass | Pass | Pass |
| 50 MEK Rubs | Fail | Pass | Pass | Pass |
| 4H Hardness | Pass | Pass | Pass | Pass |
| 1 Hr. @ 275° C. | Brown | Slight discoloration | Slight discoloration | Slight discoloration |

Example 3

Exemplary Coating Formulation

An exemplary coating formulation was prepared using the components set forth below in Table 8.

TABLE 8

Exemplary basecoat coating components

| Component | Wt. % |
|---|---|
| Water reducible carboxyl functional polyester | 56.49 |
| Deionized water | 16.14 |
| Pigment | 8.77 |
| 1-Methoxy-2-propanol | 5.88 |
| Adhesion promoter | 4.02 |
| Dimethylethanolamine (DMAE) | 3.99 |
| 2-Butoxyethanol | 1.47 |
| Crosslinker | 1.34 |
| Dispersant | 0.70 |
| Silicone oil | 0.67 |
| Flow Aid | 0.34 |
| Surfactant | 0.10 |
| Wetting aid | 0.10 |

TABLE 9

Exemplary clearcoat coating components

| Component | Wt. % |
|---|---|
| Water reducible carboxyl functional polyester | 60.84 |
| Dionized water | 13.68 |
| 1-Methoxy-2-propanol | 5.79 |
| Adhesion promoter | 5.69 |

TABLE 9-continued

Exemplary clearcoat coating components

| Component | Wt. % |
|---|---|
| Liquid phenyl, phenyl methyl methoxy functional siloxane intermediate resin (Dow Corning 5314 intermediate) | 4.74 |
| Dimethylethanolamine (DMAE) | 4.29 |
| Crosslinker | 1.90 |
| 2-Butoxyethanol | 1.45 |
| Silicone fluid | 0.95 |
| Flow aid | 0.47 |
| Pigment | 0.20 |

First, the polyester resin was combined with the first quantity of DMAE to neutralize the acid groups (3.5 wt %) then combined with deionized water (16.79 wt. %) under low speed mixing. Then, the DMAE (0.49 wt %) was added to adjust the pH to between 8.5 and 9.5, in the case of the clear coat followed by slowly adding the organoalkoxysilane under mixing at medium speed. The crosslinker and 2-butoxyethanol were pre-mixed with one other and then added under mixing at medium speed. The surfactant and silicone oil emulsion were then sequentially added under mixing at low/medium speed. The remainder of the additives were added in order under mixing at low/medium speed.

The coating composition was then applied to a substrate and cured for 5 minutes at 275° C.

The above coating demonstrated the following testing results/properties, set forth in Table 10 below.

TABLE 10

Coating testing results/properties

| Test Method | Description | Result/Property |
|---|---|---|
| Internal Test 132D | Adhesion by crosshatch/tape pull with boiling water | Pass |
| ASTM D4145 | 0T bend | Pass |
| ASTM D2794 | Impact | Pass |
| ASTM D3363 | Pencil hardness | 5H at room temperature, 4 H at 400° F. (204° C.) |

Internal test method 132D is as follows.
1. Scope
This procedure measures the adhesion of coatings to a substrate by the crosshatch adhesion method in combination with exposure to boiling water.
2. Equipment and Materials
2.1 Container large enough to hold articles to be tested; a lid to cover the container after inserting the articles.
2.2 Electric hot plate or gas burner stove.
2.3 Timer.
2.4 Water (Deionized water may be used, but is not required).
2.5 Cloth or paper towels.
3. Procedure
3.1 Fill container with sufficient water to cover most of the article to be tested. Place container on stove or hot plate and bring to a boil. Reduce heat to maintain a constant simmer. Keep covered.
3.2 Scribe a grid pattern on the article to be tested. Do not check the adhesion with tape. See Note 5.3.
3.3 Immerse article in the boiling water. Set timer for required time. The usual time was fifteen (15) minutes unless otherwise specified.

3.4 Remove article at required time. Dry immediately with towel.

3.5 Apply tape and check adhesion.

4. Evaluation 4.1 Evaluate and report.

4.2 Evaluations may be made at several time intervals after removal from the boiling water to determine if recovery of adhesion takes place. In this case, multiple grid patterns must be scribed. Record the results and the time interval after removal.

5. Comments/Precautions 5.1 Conduct initial tape test within 60+15 seconds of removal from water.

5.2 If a series of tests are being conducted, maintain a constant water level. Also, replace water periodically to avoid a build-up of salts or other debris, especially if using tap water.

5.3 The order of testing may be reversed to scribe the grid pattern and conduct the tape test both after removal from the water. This is the procedure described in the British Standard Specification BS7069:1988, Appendix A2. However, unless otherwise specified, the procedure shall be as described above.

Example 4

Additional Exemplary Coating Formulation

A second exemplary coating formulation was prepared using the components set forth below in Table 11, prepared in a similar manner as the formulation of Example 3 above.

TABLE 11

Exemplary coating components

| Component | Wt. % |
|---|---|
| Acrylic resin (as a ca. 30 wt. % solids solution in water and solvents—30.59 wt. % acrylic resin, 7.72 wt. % Dimethylaminoethanol (DMAE), 17.62 wt. % butyl cellosolve, 44.1 wt. % deionized water) | 80.74 |
| Liquid phenyl, phenylmethyl methoxy functional siloxane intermediate resin (Dow Corning 5314 intermediate) | 12.11 |
| Silicone oil emulsion | 1.39 |
| Surfactant | 0.93 |
| Pigment | 2.04 |
| Other ingredients | 2.79 |
| Total | 100 |

Example 5

Third Exemplary Coating Formulation

A third exemplary coating formulation was prepared using the components set forth below in Table 12.

TABLE 12

Exemplary coating components

| Component | Wt. % |
|---|---|
| Polyurethane-modified polyester resin (Idroben 10709) | 54 |
| Deionized water | 5 |
| Liquid phenyl, phenylmethyl methoxy functional siloxane intermediate resin (Dow Corning 5314 intermediate) | 10 |
| Crosslinker (highly methylated, monomeric melamine crosslinker, Cymel 303) | 0.2 |
| Butyl cellosolve solvent (2-butoxyethanol) | 1 |
| Surfactant | 0.55 |
| Monoethylene glycol solvent | 3.5 |
| Pigment paste | 19 |
| Low molecular weight polytetraethylene (PTFE) (Dyneon PTFE TF 9205) | 1 |
| Triethylamine (TEA) solvent | 0.7 |
| Dimethylethanolamine (DMEA) | 0.4 |
| Deionized water | 3.85 |
| Acrylic thickener | 0.8 |
| Total | 100 |

First, the polyester resin was combined with the first quantity of deionized water under low speed mixing. The crosslinker and 2-butoxyethanol were pre-mixed with one other and then added under mixing at medium speed. The surfactant and low molecular weight PTFE were then sequentially added under mixing at low/medium speed. Then, the DMAE was added to adjust the pH to between 8.5 and 9.5, followed by slowly adding the siloxane intermediate under mixing at medium speed. The triethylamine, pigment paste, second quantity of deionized water and thickener were pre-mixed with one another and then added under mixing at low/medium speed.

The coating was roller coated onto a flat aluminum substrate pretreated with an alkali wash and etched to a surface roughness profile of 0.7 μm, followed by curing the applied coating for 5 minutes at a temperature of 200-220° C. The coated metal substrate was deep drawn into a pan shape. The coating demonstrated good adhesion to the substrate prior and during the deep draw as determined by visual inspection. The coated substrate was then subjected to an adhesion test wherein water was boiled inside the pan for 20 minutes by direct exposure to a heating flame, followed by visually inspecting the pan for damage on the bottom of the pan from the heating flame. An adhesion test of 2×10 mm crosshatch followed by 5 tape pulls was carried out on both the side wall and the bottom of the pan. The coating passed each of the foregoing tests.

Aspects

Aspect 1 is a polyester polymer, comprising: an alcohol component including a diol and a polyol; an acid component including terephthalic acid and isophthalic acid, wherein the terephthalic acid and isophthalic acid are present in a molar ratio of terephthalic acid to isophthalic acid of 0.6:1.0 to 0.9:1.0; carboxylic acid functional groups; a weight average molecular weight (MW) of at least 5000 Daltons (Da); and an acid value (AV) of 40 to 65.

Aspect 2 is the polyester polymer of Aspect 1, wherein the diol and polyol are present in a molar ratio of 0.3:1.0 to 0.9:1.0.

Aspect 3 is the polyester polymer of Aspects 1 or 2, comprising, based a total weight of the polyester polymer: at least one diol in an amount of 8.0 wt. % to 16.0 wt. %, at least one polyol in an amount of 20.0 wt. % to 40.0 wt. %, terephthalic acid in an amount of 19.0 wt. % to 26.0 wt. %; and isophthalic acid in an amount of 23.0 wt. % to 30.0 wt. %.

Aspect 4 is the polyester polymer of any of Aspects 1-3, wherein the diol is ethylene glycol and the polyol is trimethylolpropane.

Aspect 5 is the polyester polymer of any of Aspects 1-4, further comprising an end-capping component present in an amount of 1.0 wt. % to 4.0 wt. %, based a total weight of the polyester polymer.

Aspect 6 is the polyester polymer of Aspect 5, wherein the end-capping component comprises benzoic acid.

Aspect 7 is the polyester polymer of any of Aspects 1-6, wherein the polyester polymer has a fluorine content of less than 1.0 wt. %, based a total weight of the polyester polymer.

Aspect 8 is a method of forming a polyester polymer, comprising reacting, in a first stage at temperature of 80° C. to 240° C. in the presence of a catalyst, an alcohol component including a diol component and a polyol component and an acid component including terephthalic acid and isophthalic acid, wherein the terephthalic acid and isophthalic acid are present in a molar ratio of terephthalic acid to isophthalic acid of 0.6:1.0 to 0.9:1.0, to form a polyester polymer having an acid value of (AV) of 20 or less.

Aspect 9 is the method of Aspect 8, wherein the reacting step further comprises reacting, based a total weight of the polyester polymer: at least one diol in an amount of 8.0 wt. % to 16.0 wt. %, at least one polyol in an amount of 20.0 wt. % to 40.0 wt. %, terephthalic acid in an amount of 19.0 wt. % to 26.0 wt. %, isophthalic acid in an amount of 23.0 wt. % to 30.0 wt. %; and at least one end-capping component in an amount of 1.0 wt. % to 4.0 wt. %.

Aspect 10 is the method of Aspects 8 or 9, wherein the end-capping component comprises benzoic acid.

Aspect 11 is the method of any of Aspects 8-10, further comprising reacting, in a second stage at temperature of 130° C. to 220° C., the polyester polymer with trimellitic anhydride to form a carboxyl functionalized polyester polymer including carboxylic acid functional groups and an acid value of (AV) of 40 to 65.

Aspect 12 is the method of any of Aspects 8-11, wherein the polyester polymer comprises a weight average molecular weight (MW) of at least 5000 Daltons (Da).

Aspect 13 is a method of coating a substrate, comprising applying, to the surface of a substrate, a water-based coating composition including a carboxyl functionalized polyester polymer comprising an alcohol component including a diol component and a polyol component, an acid component including terephthalic acid and isophthalic acid, wherein the terephthalic acid and isophthalic acid are present in a molar ratio of terephthalic acid to isophthalic acid of 0.6:1.0 to 0.9:1.0, carboxylic acid functional groups, a weight average molecular weight (MW) of at least 5000 Daltons (Da); and an acid value (AV) of 40 to 65; and curing the coating composition at a temperature of 180° C. to 300° C. to form a coating.

Aspect 14 is the method of Aspect 13, wherein the coating has at least one of: a glass transition temperature of at least 80° C. as determined by dynamic scanning calorimetry (DSC), a pencil hardness of at least 2H at a temperature of 400° F. (204° C.) according to ASTM D3363, and a pass result when tested for 0T bend according to ASTM D4145.

Aspect 15 is the method of Aspects 13 or 14, wherein a total amount of any non-aqueous solvents present in the coating composition is 5 wt. % or less, based on a total weight of the coating composition.

Aspect 16 is the method of any of Aspects 13-15, wherein the substrate is an article of cookware.

Aspect 17 is a coated article, comprising a substrate; and a coating on the substrate, the coating comprising polyester and having at least one of: a glass transition temperature of at least 80° C. as determined by dynamic scanning calorimetry (DSC), a pencil hardness of at least 2 H at a temperature of 400° F. (204° C.) according to ASTM D3363, and a pass result when tested for 0 T bend according to ASTM D4145.

Aspect 18 is the coated article of Aspect 17, wherein the substrate is an article of cookware.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while the disclosure has been described in terms of "a" polyester polymer, a mixture of such polymers can be used. Also, as used herein, the term "polymer" is meant to refer to prepolymers, oligomers and both homopolymers and copolymers; the prefix "poly" refers to two or more. When ranges are given, any endpoints of those ranges and/or numbers within those ranges can be combined within the scope of the present disclosure. Including and like terms means "including but not limited to". Similarly, as used herein, the terms "on", "applied on/over", "formed on/over", "deposited on/over", "overlay" and "provided on/over" mean formed, overlay, deposited, or provided on but not necessarily in contact with the surface. For example, a coating layer "formed over" a substrate does not preclude the presence of one or more other coating layers of the same or different composition located between the formed coating layer and the substrate.

As used herein, the phrase "or any other range combination using these endpoints" literally means that any range may be selected from any two of the values listed prior to such phrase regardless of whether the values are in the lower part of the listing or in the higher part of the listing. For example, a pair of values may be selected from two lower values, two higher values, or a lower value and a higher value.

Whereas particular examples of this invention have been described above for purposes of illustration, it will be evident to those skilled in the art that numerous variations of the details of the present invention may be made without departing from the invention as defined in the appended claims.

What is claimed is:

1. A polyester polymer, comprising:
   an alcohol component including a diol and a polyol;
   an acid component including terephthalic acid and isophthalic acid, wherein the terephthalic acid and isophthalic acid are present in a molar ratio of terephthalic acid to isophthalic acid of 0.6:1.0 to 0.9:1.0;
   carboxylic acid functional groups;
   a weight average molecular weight (MW) of at least 5000 Daltons (Da); and
   an acid value (AV) of 40 to 65.

2. The polyester polymer of claim 1, wherein the diol and polyol are present in a molar ratio of 0.3:1.0 to 0.9:1.0.

3. The polyester polymer of claim 2, comprising, based a total weight of the polyester polymer:
   at least one diol in an amount of 8.0 wt. % to 16.0 wt. %;
   at least one polyol in an amount of 20.0 wt. % to 40.0 wt. %;

terephthalic acid in an amount of 19.0 wt. % to 26.0 wt. %; and isophthalic acid in an amount of 23.0 wt. % to 30.0 wt. %.

4. The polyester polymer of claim 1, wherein the diol is ethylene glycol and the polyol is trimethylolpropane.

5. The polyester polymer of claim 1, further comprising an end-capping component present in an amount of 1.0 wt. % to 4.0 wt. %, based a total weight of the polyester polymer.

6. The polyester polymer of claim 5, wherein the end-capping component comprises benzoic acid.

7. The polyester polymer of claim 1, wherein the polyester polymer has a fluorine content of less than 1.0 wt. %, based a total weight of the polyester polymer.

8. A method of forming a polyester polymer, comprising:
reacting, in a first stage at temperature of 80° C. to 240° C. in the presence of a catalyst, an alcohol component including a diol component and a polyol component and an acid component including terephthalic acid and isophthalic acid, wherein the terephthalic acid and isophthalic acid are present in a molar ratio of terephthalic acid to isophthalic acid of 0.6:1.0 to 0.9:1.0, to form a polyester polymer having an acid value of (AV) of 20 or less;

reacting, in a second stage at temperature of 130° C. to 220° C., the polyester polymer with trimellitic anhydride to form a carboxyl functionalized polyester polymer including carboxylic acid functional groups and an acid value of (AV) of 40 to 65; and wherein the polyester polymer comprises a weight average molecular weight (MW) of at least 5000 Daltons (Da).

9. The method of claim 8, wherein the reacting step further comprises reacting, based a total weight of the polyester polymer:
at least one diol in an amount of 8.0 wt. % to 16.0 wt. %;
at least one polyol in an amount of 20.0 wt. % to 40.0 wt. %;
terephthalic acid in an amount of 19.0 wt. % to 26.0 wt. %;
isophthalic acid in an amount of 23.0 wt. % to 30.0 wt. %; and
at least one end-capping component in an amount of 1.0 wt. % to 4.0 wt. %.

10. The method of claim 9, wherein the end-capping component comprises benzoic acid.

11. A method of coating a substrate, comprising:
applying, to the surface of a substrate, a water-based coating composition including a carboxyl functionalized polyester polymer comprising:
an alcohol component including a diol component and a polyol component;
an acid component including terephthalic acid and isophthalic acid, wherein the terephthalic acid and isophthalic acid are present in a molar ratio of terephthalic acid to isophthalic acid of 0.6:1.0 to 0.9:1.0;
carboxylic acid functional groups;
a weight average molecular weight (MW) of at least 5000 Daltons (Da); and
an acid value (AV) of 40 to 65; and
curing the coating composition at a temperature of 180° C. to 300° C. to form a coating.

12. The method of claim 11, wherein the coating has at least one of:
a glass transition temperature of at least 80° C. as determined by dynamic scanning calorimetry (DSC);
a pencil hardness of at least 2H at a temperature of 400° F. (204° C.) according to ASTM D3363; and
a pass result when tested for OT bend according to ASTM D4145.

13. The method of claim 11, wherein a total amount of any non-aqueous solvents present in the coating composition is 5 wt. % or less, based on a total weight of the coating composition.

14. The method of claim 11, wherein the substrate is an article of cookware.

15. The method of claim 8, wherein the diol and polyol are present in a molar ratio of 0.3:1.0 to 0.9:1.0.

16. The method of claim 8, wherein the diol is ethylene glycol and the polyol is trimethylolpropane.

17. The method of claim 8, wherein the polyester polymer has a fluorine content of less than 1.0 wt. %, based on a total weight of the polyester polymer.

18. The method of claim 11, wherein the diol and polyol are present in a molar ratio of 0.3:1.0 to 0.9:1.0.

19. The method of claim 11, wherein the diol is ethylene glycol and the polyol is trimethylolpropane.

20. The method of claim 11, wherein the polyester polymer has a fluorine content of less than 1.0 wt. %, based on a total weight of the polyester polymer.

* * * * *